US006785951B2

United States Patent
Carl, Jr. et al.

(10) Patent No.: US 6,785,951 B2
(45) Date of Patent: Sep. 7, 2004

(54) ROTOR ASSEMBLY AND METHOD OF MAKING

(75) Inventors: Ralph James Carl, Jr., Clifton Park, NY (US); Gerald Burt Kliman, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 10/703,354

(22) Filed: Nov. 6, 2003

(65) Prior Publication Data

US 2004/0070303 A1 Apr. 15, 2004

Related U.S. Application Data

(62) Division of application No. 10/063,852, filed on May 20, 2002.

(51) Int. Cl.$^7$ .............................................. H02K 15/00
(52) U.S. Cl. .......................... 29/598; 310/42; 310/263; 335/284
(58) Field of Search ......................... 29/598, 596, 606, 29/607, 602.1; 310/42, 263, 156.66–156.73, 156.47; 335/284, 209; 361/143

(56) References Cited

U.S. PATENT DOCUMENTS

| | | | |
|---|---|---|---|
| 1,298,465 A | * 3/1919 | Dean ..................... 310/156.55 |
| 2,312,101 A | 2/1943 | Killan et al. ................. 310/263 |
| 3,417,295 A | * 12/1968 | Littwin ........................ 361/143 |
| 3,599,024 A | 8/1971 | Kitamura ..................... 310/263 |
| 4,104,787 A | 8/1978 | Jandeska et al. .............. 29/596 |
| 5,557,248 A | * 9/1996 | Prochazka ................... 335/284 |
| 5,786,652 A | 7/1998 | Gueraud et al. ............. 310/263 |
| 6,218,753 B1 | 4/2001 | Asano et al. ................ 310/156 |
| 6,340,857 B2 | 1/2002 | Nishiyama et al. .... 310/156.53 |
| 6,359,366 B1 | 3/2002 | Liang et al. ................. 310/263 |
| 6,519,833 B2 | * 2/2003 | Futami et al. ................. 29/596 |

* cited by examiner

*Primary Examiner*—Dang Le
(74) *Attorney, Agent, or Firm*—William E. Powell; Patrick K. Patnode

(57) ABSTRACT

A rotor assembly is provided in which the rotor assembly includes a first core portion, wherein the first core portion has at least one first core protrusion, and a second core portion, wherein the second core portion has at least one second core protrusion. The first core portion and the second core portion are configured to be matingly coupled to each other so as to form an assembled rotor assembly. In addition, the rotor assembly includes a number of magnetizable members wherein respective ones of the magnetizable members are coupled to each of the first core protrusions and coupled to each of the second core protrusions. The magnetizable members are adapted to be coupled to a magnetizing fixture prior to mating the first and second core portions so as to magnetize the magnetizable members.

8 Claims, 3 Drawing Sheets

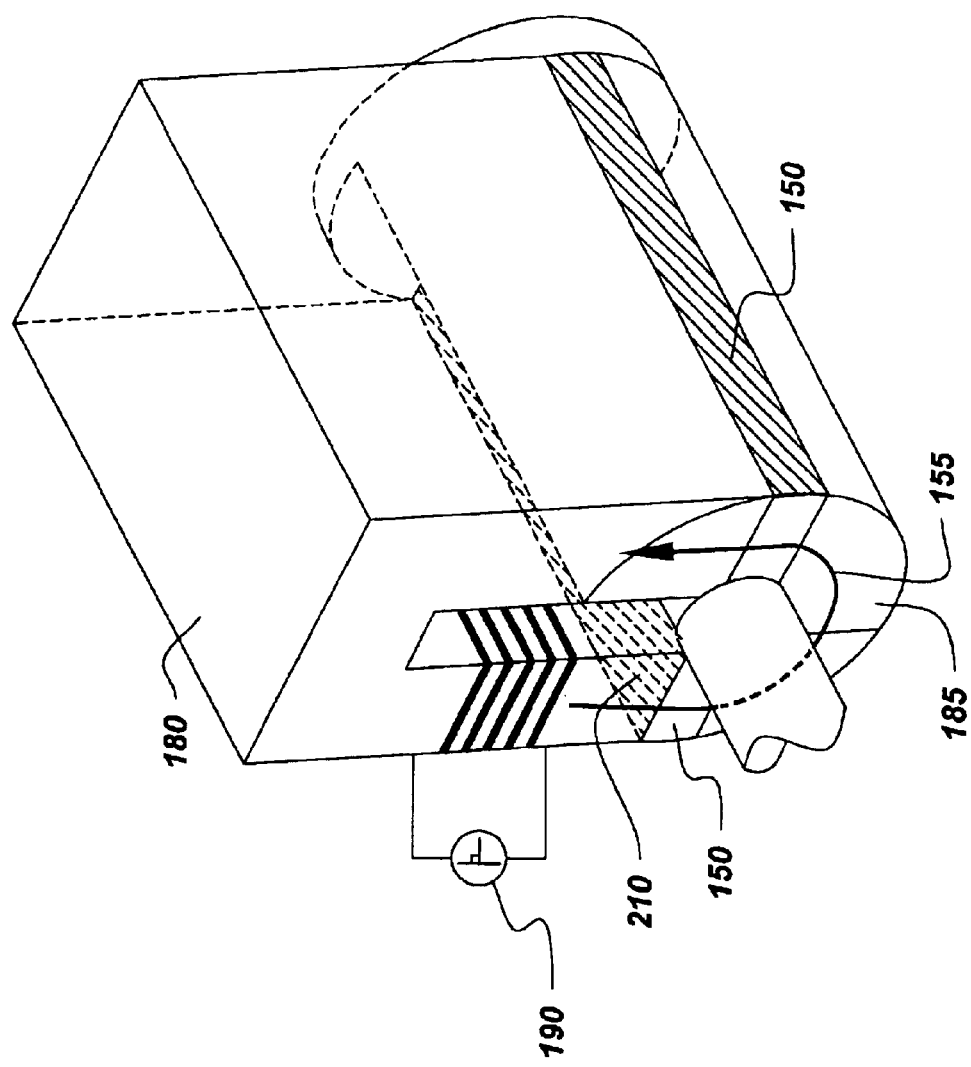

ROTOR ASSEMBLY AND METHOD OF MAKING

CROSS-REFERENCE TO RELATED APPLICATIONS

This application is a divisional of application Ser. No. 10/063,852, filed May, 20, 2002, which is hereby incorporated by reference in its entirety.

BACKGROUND OF INVENTION

The present invention relates generally to a rotor for rotary machines, and more particularly to an interior-type permanent magnet rotor and method of making.

Interior-type permanent magnet rotors typically comprise a solid or laminated rotor having permanent magnets disposed in the rotor. In addition, interior-type permanent magnet rotors typically combine synchronous and induction characteristics in their rotor structure and may be used in different environments with alternating current so as to provide a generally constant torque output. In addition, the interior-type permanent magnets focus magnetic flux into an air gap between the rotor and a stator. Furthermore, having the permanent magnets disposed in the rotor typically eliminates the need for rotating electrical connections, saves electrical power otherwise expended in exciting a field winding, lessens the amount of internal heat generation in the field winding and increases power density.

The interior-type permanent magnet rotor comprises a plurality of slots that are typically pre-formed in the interior of the rotor (rotor laminations are stamped out during manufacture) so as to allow the permanent magnets to be disposed therein. While this type of rotor construction has proved to be quite reliable, the pre-formed structure of the rotor, in addition to clearance gaps defined between the permanent magnets and the rotor, typically degrade the amount of magnetic flux focused into the air gap between the rotor and stator. The clearance gap between the magnet and the rotor is typically created to facilitate the disposal of the permanent magnet into the rotor. However, a portion of the magneto-motive-force (MMF) produced by the magnet is typically used to overcome the effect of the clearance gap. In addition, the clearance gap adds to the magnetic reluctance in the motor. In some designs, magnetized permanent magnets are typically inserted into the slots in the rotor and handling of such magnetized permanent magnets is difficult because of the forces of attraction between the magnets and steel structures of the rotor.

Accordingly, there is a need in the art for an interior-type permanent magnet rotor having improved magnet retention.

SUMMARY OF INVENTION

One embodiment of the present invention comprises a rotor assembly comprising a first core portion, wherein the first core portion has at least one first core protrusion, and a second core portion, wherein the second core portion has at least one second core protrusion. The first core portion and the second core portion are configured to be matingly coupled to each other so as to form an assembled rotor assembly. In addition, the rotor assembly comprises a plurality of magnetizable members wherein respective ones of the plurality of magnetizable members are coupled to each of the first core protrusions and coupled to each of the second core protrusions. The plurality of magnetizable members are adapted to be coupled to a magnetizing fixture prior to mating the first and second core portions so as to magnetize the magnetizable members.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein:

FIG. 3 is a perspective view of a magnetizing fixture disposed on a rotor portion in accordance with another embodiment of the present invention.

DETAILED DESCRIPTION

Figure 1:
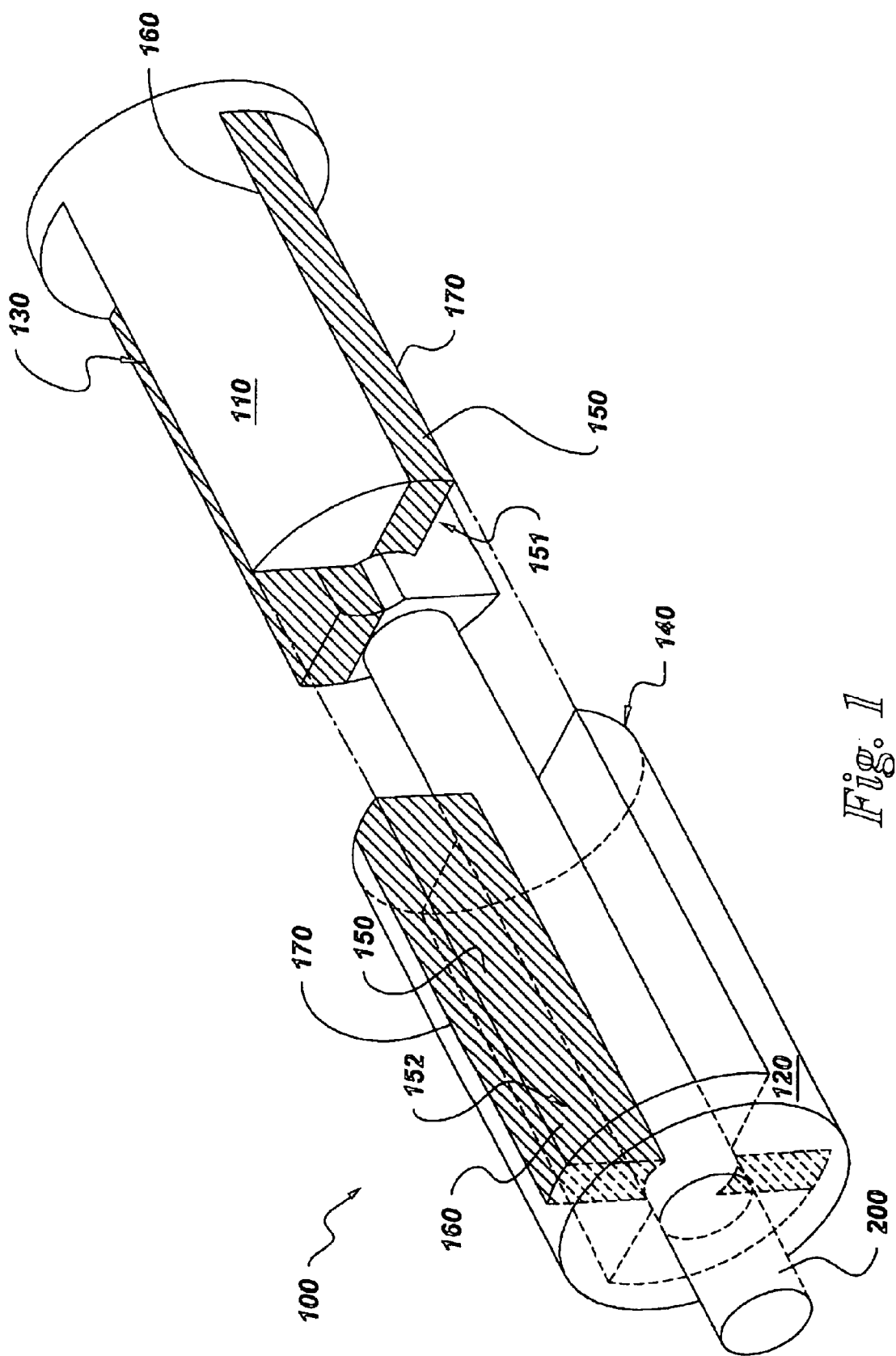
FIG. 1 is a perspective view of a rotor assembly in accordance with one embodiment of the present invention.

In one embodiment of the present invention, a rotor assembly 100 comprising a first core portion 110, having a first core protrusion 130, and a second core portion 120, having a second core protrusion 140, is shown in FIG. 1. The first core portion 110 and the second core portion 120 are configured to be matingly coupled to each other so as to form the rotor assembly 100. As used herein, the term "matingly coupled" refers to the shape of the first and second core portions 110, 120 wherein both portions are capable of being connected to form an integral rotor assembly appropriate for use in a motor device. In addition, the rotor assembly 100 comprises a plurality of magnetizable members 150 wherein each of the magnetizable members 150, when magnetized, has a north pole face 160 and a south pole face 170. The number of protrusions shown in the drawing Figures are shown by way of example and not limitation and may vary depending on a desired application, for example, an application requiring a predetermined number of poles.

In one exemplary embodiment, the first core portion 110 comprises a first magnetizable member 151 having the north pole face 160 coupled to the first core protrusion 130 and the south pole face 170 adapted to be coupled (discussed below) to a magnetizing fixture 180 (see FIG. 3) prior to mating the first and second core portions 110, 120. In this embodiment, the second core portion 120 comprises a second magnetizable member 152 (see FIG. 1), that, when magnetized, has the south pole face 170 coupled to the second core protrusion 140 and the north pole face 160 adapted to be coupled to the magnetizing fixture 180 (see FIG. 3) prior to mating the first and second core portions 110, 120. In another embodiment, the north and south pole faces 160, 170 of the abovementioned embodiment may be switched such that the south pole face 170 of the first magnetizable member 151 is coupled to the first core protrusion 130 and the north pole face 160 of the second magnetizable member 152 is coupled to the second core protrusion 120 (not shown).

The magnetizing fixture 180 magnetizes the magnetizable members 150 by supplying a magnetizing field 155 (as depicted by the arrow in Drawing FIG. 3) and directing the magnetizing field 155 through a magnetizing surface 210 and through the magnetizable members 150. As used herein, the term "magnetize" refers to the process of magnetizing a magnetizable material by introducing a magnetic field therethrough. It will be appreciated that a wedge 185, typically comprising laminated iron, is used in conjunction with the magnetizing fixture 180 so as to allow the magnetizing field 155 to pass therethrough. A power supply 190 is typically used to generate a current pulse to generate the magnetizing field 155.

In one embodiment of the present invention, the magnetizing fixture 180 comprises a plurality of laminations (not shown) having the magnetizing surface 210 disposed on a pole face of a respective one of the magnetizable members 150. As used herein, the terms "thereon", "therein", "over", "above", "on", "in" and the like are used to refer to the relative location of elements of rotor assembly 100 as illustrated in the Figures and are not meant to be a limitation in any manner with respect to the orientation or operation of rotor assembly 100. In another embodiment, the magnetizing surface 210 comprises a plurality of laminations wherein such laminations are skewed to match a surface of a respective one of the first or second skewed core protrusions 135, 145. In an exemplary embodiment, the magnetizing surface 210 of magnetizing fixture 180 is disposed over the entirety of either one of the north or south pole faces 160, 170 so as to direct the magnetizing field 155 therethrough.

The rotor assembly 100 is typically used as the rotor of a brushless DC motor, synchronous motor or the like. The motors typically comprise a stationary stator assembly (not shown) and the rotor assembly 100 having the magnetizing members 150 disposed therein. The first core portion 110 and the second core portion 120 of the rotor assembly 100 are typically coupled by a connecting member 200, such as a shaft, that is disposed through an axial bore in the first and second core portions 110 and 120 (see FIG. 1). In another embodiment, pins, adhesives or the like are typically used to matingly couple the first and second core portions 110, 120. It will be appreciated that stators of various constructions and configurations (e.g. slots and teeth) may be utilized in cooperative relation with the rotor assembly 100 of the present invention depending upon a desired application. In other embodiments, the rotor assembly 100 is typically disposed in a shell (not shown). In one embodiment, the shell is selected from the group consisting of fiberglass, wire and aramid filament yarns, for example, Kevlar™ (offered for sale by DuPont Co., Wilmington, Del.). In another embodiment, the shell comprises a tubular member, such as a tubular can, disposed over the rotor assembly. In operation, the shell typically absorbs radial stresses generated by the centrifugal forces in the rotor.

Figure 2:
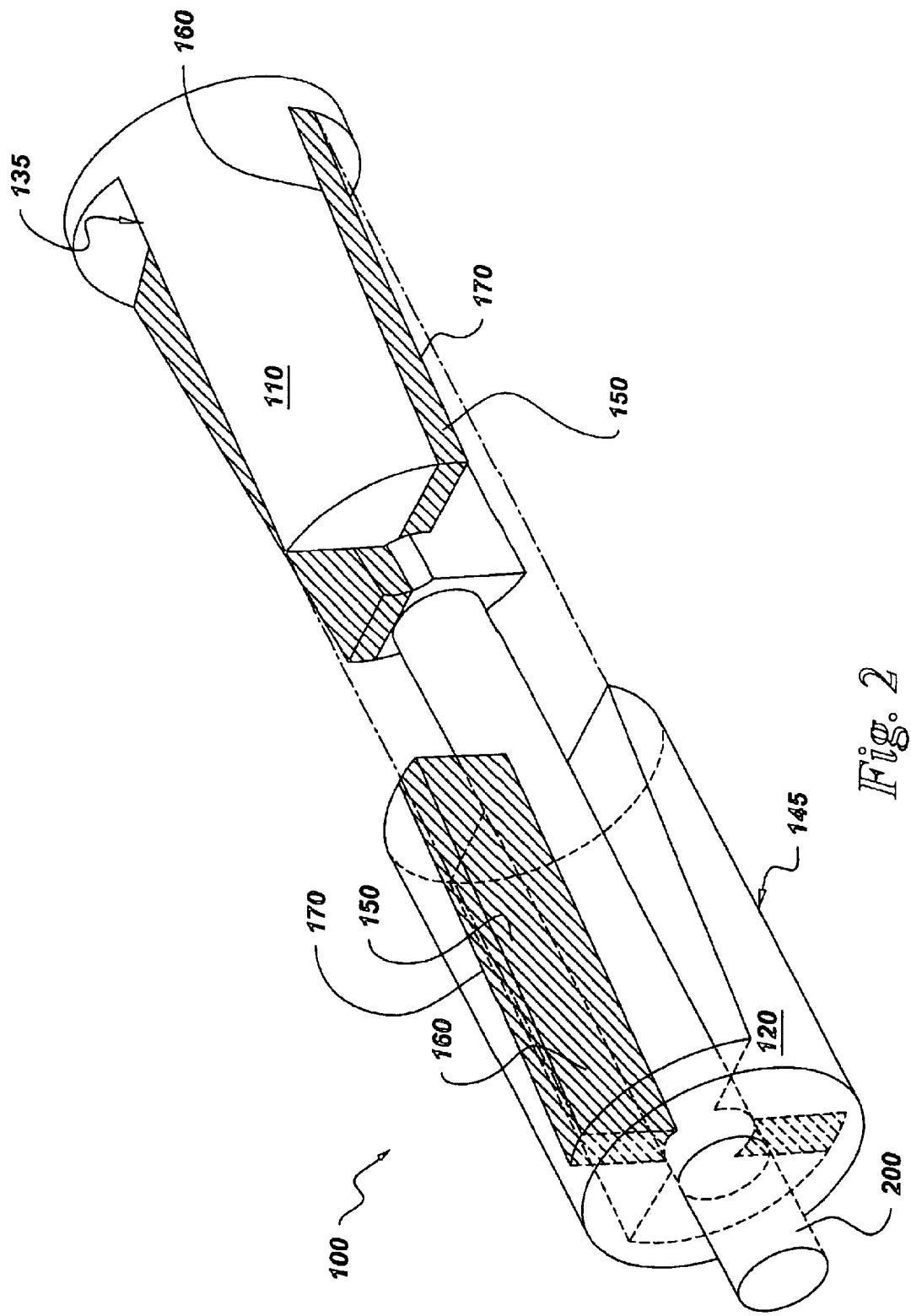
FIG. 2 is a perspective view of the rotor assembly in accordance with another embodiment of the present invention.

In another embodiment, the first and second core portions 110, 120 comprise the first and second core protrusions 130, 140 respectively, wherein the shape of the first and second core protrusions 130, 140 is skewed (see FIG. 2) so as to affect a magnetic field in the air gap defined between the stator and the rotor (not shown). As used herein, the term "skewed" refers to core protrusions that are oblique in shape. One example of a first skewed core protrusion 135 and a second skewed core protrusion 145 is shown in Drawing FIG. 2. As a result of having the skewed core protrusions 135, 145, the magnetic field in the motor is affected so that the reluctance torque is reduced compared to conventional interior-type permanent magnet rotors.

In one embodiment, the magnetizable members 150 comprise bonded magnets. By way of example and not limitation, the term "bonded magnets", as used herein, refers to a magnet having a powder embedded in a polymer matrix. In one embodiment, the powder typically comprises a neodymium-iron-boron alloy. By way of example and not limitation, it will be appreciated that the magnetizable members 150 are formed by using the powder with a polymer such as thermoplastic resin, a thermosetting resin or a rubber material that is overmolded onto a surface of the core protrusions. As used herein, the terms "overmolded or overmolding" refer to a process by which a respective core portion is inserted into a mold and a gap defined between the core portion and the mold is filled with a polymer so as to form a respective one of the magnetizable members 150. In another embodiment, the magnetizable members 150 comprise sintered or cast magnets. As used herein, "sintered magnets" refers to magnets that are prepared by fusing compressed magnetic powder at a predetermined temperature and pressure. It will be appreciated that the magnetizable members 150 also comprise magnetic materials therein.

In one embodiment, the first and second core portions 110, 120 typically comprise a material comprising a ferrous material. In another embodiment, the first and second core portions 110, 120 comprise laminations of ferrous material. In other embodiments, the ferrous material in the above-mentioned embodiments typically comprises a composite ferrous material. For example, a typical composite ferrous material used for the first and second core portions 110, 120 is SM-2TM (offered for sale by MiiTechnologies, New Lebanon, N.H.). One advantage to using such composite ferrous material is that eddy currents induced in the core portions by high frequency components of a stator field are reduced compared to typical ferrous alloys, such as carbon steel. Another advantage to using such composite ferrous materials is that such materials are easily molded into a desired shape through a compaction process.

A method of making rotor components for the rotor assembly 100 comprises forming the first core portion 110, wherein the first core portion 110 has the at least one first core protrusion 130, forming the second core portion 120, wherein the second core portion 120 has the at least one second core protrusion 140, coupling a plurality of magnetizable members 150, wherein respective ones of said plurality of magnetizable members 150 are coupled to each of the first core protrusions 130 and coupled to each of the second core protrusions 140, and magnetizing the plurality of magnetizable members 150 prior to coupling the first and second core portions 110, 120. The method of making the rotor components for the rotor assembly 100 further comprises assembling the first and second core portions 110, 120 so as to form the rotor assembly 100. In an alternative embodiment, the method of making rotor components for the rotor assembly 100 comprises forming the first core portion 110, wherein the first core portion 110 has the at least one first skewed core protrusion 135, forming the second core portion 120, wherein the second core portion 120 has the at least one second skewed core protrusion 145, coupling a plurality of magnetizable members 150, wherein respective ones of said plurality of magnetizable members 150 are coupled to each of the first skewed core protrusions 135 and coupled to each of the second skewed core protrusions 144, and magnetizing the plurality of magnetizable members 150 prior to coupling the first and second core portions 110, 120 (see FIG. 2).

In one embodiment of the abovementioned methods, "magnetizing the magnetizable members" comprises disposing the magnetizing surface 210 of the magnetizing fixture 180 over the entirety of a pole face of a respective one of the plurality of magnetizable members 150. In operation, the magnetizing fixture 180 directs the magnetizing field 155 through the magnetizing surface 210 and through the magnetizable members 150. In another embodiment, "coupling the plurality of magnetizable members" comprises overmolding respective ones of the plurality of magnetizable members 150 to a surface of the first core protrusion 130 and to a surface of the second core protrusion 140 or, alternatively, to a surface of the first skewed core protrusion 135 and to a surface of the second skewed core protrusion 145.

One advantage to overmolding the magnetizable members 150 to the rotor protrusions is that the need for forming pockets in a rotor stack so as to secure the magnetizable members 150 is eliminated. In addition, another advantage to overmolding the magnetizable members 150 to the core protrusions is that more magneto-motive-force (MMF) is transferred to the air gap (defined between the rotor and the stator) where torque is produced compared to conventional interior-type permanent magnet rotors. As used herein, "magneto-motive-force" refers to the work that is required to carry a magnetic pole of unit strength once around a magnetic circuit. In some conventional interior-type permanent magnet rotors, a clearance gap typically results between a housing slot and a permanent magnet during assembly wherein the clearance gap typically disturbs the magnetic flux distribution in the motor thereby resulting in a magnetic reluctance. Another advantage of the present invention is that by overmolding the magnetizable members 150 to the first and second core protrusions 130, 140 or on the first and second skewed core protrusions 135, 145, the distortion to the magnetic flux distribution is decreased because the core protrusions and the magnetizable members 150 are sandwiched such that the clearance gap between such protrusions and magnetizable members 150 is decreased with respect to conventional to conventional interior-type permanent magnet rotors. Additionally, as a result of reducing the clearance gap, the magnetic reluctance in the motor is decreased with respect to conventional to conventional interior-type permanent magnet rotors. Furthermore, the ability to magnetize the magnetizable members 150 after the are coupled to the core portions facilitates manufacturing of such rotor assemblies because in conventional rotors, the magnets are typically pre-magnetized which makes handling difficult due to the forces of attraction between the magnets and the forces of attraction to the steel structures of the rotor.

It will be apparent to those skilled in the art that, while the invention has been illustrated and described herein in accordance with the patent statutes, modification and changes may be made in the disclosed embodiments without departing from the true spirit and scope of the invention. It is, therefore, to be understood that the appended claims are intended to cover all such modifications and changes as fall within the true spirit of the invention.

What is claimed is:

1. A method of making rotor components comprising:
    forming a first core portion, said first core portion having at least one first core protrusion;
    forming a second core portion, said second core portion having at least one second core protrusion;
    coupling a plurality of magnetizable members wherein respective ones of said plurality of magnetizable members are coupled to each of said first core protrusions and coupled to each of said second core protrusions; and
    magnetizing said plurality of magnetizable members prior to coupling said first and second core portions.

2. The method of claim 1 further comprising assembling said first and second core portions.

3. The method of claim 1, wherein coupling said plurality of magnetizable members comprises overmolding respective ones of said plurality of magnetizable members to a surface of said first core protrusion and to a surface of said second core protrusion.

4. The method of claim 1, wherein magnetizing a respective one of said plurality of magnetizable members comprises disposing a magnetizing surface of said magnetizing fixture over the entirety of a pole face of said respective one of said plurality of magnetizable members wherein said magnetizing fixture directs a magnetizing field through said magnetizing surface and through said respective one of said plurality of magnetizable members.

5. A method of making rotor components comprising:
    forming a first core portion, said first core portion having at least one first skewed core protrusion;
    forming a second core portion, said second core portion having at least one second skewed core protrusion;
    coupling a plurality of magnetizable members wherein respective ones of said plurality of magnetizable members are coupled to each of said first skewed core protrusions and coupled to each of said second skewed core protrusions; and
    magnetizing said respective magnetizable member prior to coupling said first and second core portions.

6. The method of claim 5, further comprising assembling said first and second core portions.

7. The method of claim 5, wherein coupling said plurality of magnetizable members comprises overmolding respective ones of said plurality of magnetizable members to a surface of said first skewed core protrusion and to a surface of said second skewed core protrusion.

8. The method of claim 5, wherein magnetizing a respective one of said plurality of magnetizable members comprises disposing a magnetizing surface of said magnetizing fixture over the entirety of a pole face of said respective one of said plurality of magnetizable members wherein said magnetizing fixture directs a magnetizing field through said magnetizing surface and through said respective one of said plurality of magnetizable members.

* * * * *